United States Patent [19]
Einhorn

[11] 3,978,189
[45] Aug. 31, 1976

[54] METHOD OF MAKING ARTICLE HAVING RELATIVELY MOVING MEMBERS

[75] Inventor: Ruediger Einhorn, Katonah, N.Y.

[73] Assignee: Coats & Clark, Inc., Stamford, Conn.

[22] Filed: Nov. 18, 1974

[21] Appl. No.: 524,555

[52] U.S. Cl. .............................. 264/229; 264/242; 264/250; 264/259
[51] Int. Cl.² ...................... B29C 5/00; B29D 9/00; B29F 1/00; B32B 3/00
[58] Field of Search .......... 264/242, 259, 229, 264, 264/334, 250; 164/9, 90, 303; 425/DIG. 34

[56] References Cited
UNITED STATES PATENTS

| | | | |
|---|---|---|---|
| 3,197,535 | 7/1965 | Morin | 425/DIG. 34 |
| 3,363,300 | 1/1968 | Stec | 264/242 |
| 3,591,669 | 7/1971 | Memory | 264/242 |
| 3,776,991 | 12/1973 | Marcus | 264/89 |
| 3,840,065 | 10/1974 | Hannes | 164/90 |

Primary Examiner—Willard E. Hoag
Attorney, Agent, or Firm—Burgess Ryan and Wayne

[57] ABSTRACT

A die casting process for forming an article having first and second elements intercoupled for pivotal or sliding movement. A first element is formed, as by casting, and the second element is cast with the bearing region of the first element forming a mold for the bearing region of the second element. The casting may be effected in movable dies, with the elements being moved either linearly or arcuately to the different die positions for sequentially casting the first and second elements. Freedom of the joint between the two elements is obtained by stressing the first element before the second element is cast thereabout, so that upon placing of the casting process the bearing regions of the first element spring back to their original position to enable free pivotal or sliding movement between the elements. The process is advantageously employed to fabricate a door knocker, with the U-shaped striker being the first formed element and the striking plate being the second formed element, the U-shaped striker being compressed prior to casting of the striking plate, in order to ensure free pivotal movement of the striker. The striking plate has a rear surface with a first substantially flat portion and a second portion in a plane parallel to and spaced therefrom, to enable the flat portion to be adhesively affixed to a door by means of a resilient pad, with the second portion contacting the door to ensure acoustic coupling between the striking plate and the door.

7 Claims, 12 Drawing Figures

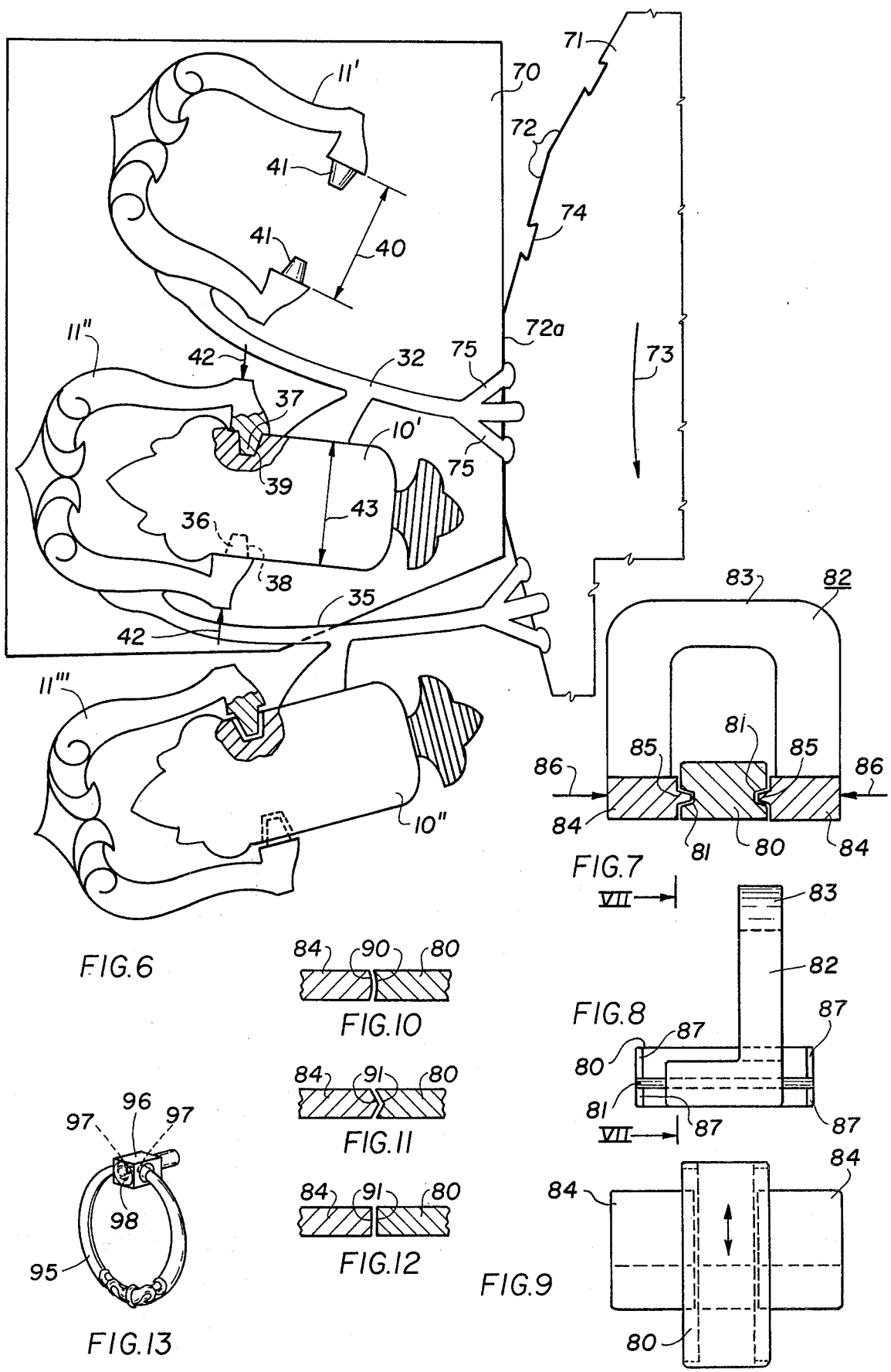

METHOD OF MAKING ARTICLE HAVING RELATIVELY MOVING MEMBERS

This invention is related to processes for the die casting of articles, in particular articles of the type having first and second relatively movable elements intercoupled together. The invention is particularly directed to the die casting of such elements in a manner to ensure free relative movement between the elements. In addition, the invention is directed to an improved door knocker particularly adaptable to fabrication by the process of the invention.

A die casting process is described, for example, in U.S. Pat. No. 2,819,494, Morin and U.S. Pat. No. 3,742,555, Hannes, for forming an article having a pair of interconnected relatively movable elements. The process employs a pair of separable dies having a first position at which a first element of the article is die cast, and a second position at which the second element of the article is die cast, the second position including a recess for receiving a previously cast first element, so that the second element is die cast with the bearing region of the first element forming the mold portion of the bearing region of the second element. The dies may be provided with a common screw for the first and second positions, and a transfer core rod adjoining the screw to enable a first element to be moved from the first position to the second position, and the combined first and second elements at the second position to be moved from the die. The transfer core rod, in accordance with the above patents, is formed as a straight rod.

In the formation of die cast articles in accordance with the above patents, which are directed only to the formation of pivotal joints, the pivotal joints are somewhat stiff following the casting process, due for example to slight irregularities in the surfaces of the formed pivot regions. In one technique for freeing the joints for loose pivotal movement, it has been suggested that the parts be relatively reciprocated prior to use. In accordance with U.S. Pat. No. 3,742,555, an improved technique for freeing the joints is provided wherein one of the elements of the article is slightly deformed, by a staking operation, to relatively spread the bearing means of the element, thereby to relieve the close fit between the bearings of the two elements. In this technique the bearing elements are formed with frustoconical surfaces, so that the staking operation may effect the slight separation of the bearing surfaces at each joint.

While the staking process has been found to be effective and economical in the provision of articles freely pivotably interconnected to each other, the technique is not readily adaptable to all types of articles. For example, for the sake of appearance, the staking marks may be undesirable in some types of articles. In addition, in other articles the physical configuration of the elements, such as their shape, thickness, etc., inhibits the effective use of a staking operation in the freeing of the pivotal interconnection.

The present invention is directed to improvements in the above process, especially with respect to the freeing of the joints between the two elements.

The invention is further directed to improvements in door knocker assemblies, the door knocker assembly being particularly adaptable to fabrication by the process in accordance with the invention.

Door knockers and the like generally are comprised of a striking plate adapted to be rigidly affixed to a door, for example by means of screws or bolts. A striker, generally a U-shaped member, is pivotally mounted on the striking plate, the bottom of the U-shaped member being adapted to strike the striking plate, to provide an audible indication of the use of the knocker.

Door knockers of this type find a major application on external doors of buildings, for example residences. Such knockers seldom find application on internal doors of dwellings, however, perhaps due to the reluctance of people to drill holes in the finely finished surfaces of inside doors. While it might be suggested that small door knockers could be adhesively affixed to inside doors, to avoid marring of the doors and to permit removal of the knockers as desired without the exhibition of unsightly holes, adhesive application of the knockers to a door by a technique which will enable removal of the knockers generally requires the use of some form of tape. The use of many conventional glues, of course, may mar the finely finished surface of the door. While adhesive tapes are available which theoretically could be employed to affix a small knocker to a door, such tapes introduce an acoustically insulating layer between the door and the knocker. Since the sound emanated from a door knocker is enhanced by the rigid acoustic coupling between the knocker and the door, for example when the knocker is screwed or bolted to the door, it is evident that the provision of an acoustically insulating layer between the knocker and the door panel reduces the effectiveness of the knocker.

In addition, prior art techniques employed for the formation of door knockers have not been adaptable for the economical production of small size knockers of adequate ornamental design for use in the interior of homes and the like.

The invention is therefore further directed to the provision of a door knocker especially adaptable for use on internal doors, which may be installed without danger of marring the doors, and which provides adequate acoustic coupling between the door knocker and the door.

Briefly stated, in accordance with the invention, a process for producing an article of the type having first and second elements intercoupled for relative movement is provided, in which the first element is initially formed, by any suitable process, but preferably by a die casting process. The second element is then die cast, with the bearing regions of the first element forming the bearing portion of the mold for the second element. In accordance with the invention, stress is applied to the bearing regions of the first element prior to the casting of the second element whereby the bearing regions of the first element are slightly displaced, within the elastic limits of the material, in a direction toward the to be formed bearing region of the second element. Following the casting of the second element, the stress on the first element is released, whereby the first element springs back to its original shape, thereby freeing the joint between the elements.

This process is adaptable to the formation of pivotal joints, as well as to the formation of sliding joints between a pair of relatively movable elements.

In one embodiment of the invention, the process is performed with the use of separable, or movable, dies, in which the first element is formed as a first position, and the second element is cast in assembled relationship with the first element at a second position. The first element may be moved linearly, by means of a straight transfer core rod, from the first position to the second position. When such dies are employed for the casting of the elements, the stress may be held on the first element, during the casting of the second element, by the recess in the movable dies at the second position for holding the first element.

In a further embodiment of the invention, employing movable dies, the transfer core rod may be arcuate, whereby the first cast element is moved in an arcuate path between the first and second positions. This technique is also adaptable to other casting processes employing movable dies, with or without the stressing of the first cast element.

Further, in accordance with the invention, a door knocker particularly adaptable to production by the above technique, is comprised of a striking plate and a striker pivotally affixed to the striking plate. The rear surface of the striking plate has a generally flat portion, and a second portion in a plane parallel to the plane of the flat portion but displaced therefrom in a direction away from the striking plate. The striker is adapted to strike the front surface of the striking plate at a position opposite the second rear portion.

The above process enables the formation of the door knocker in a relatively inexpensive manner, while still enabling the provision of a door knocker having a pleasing ornamental appearance. The U-shaped striker of the door knocker, which may be ornamented as desired, is freely pivotable with respect to the striking plate, when fabricated by the above process, without the necessity for reciprocating of the striker, nor for the provision of staking marks which are decoratively undesirable in such a product, and which may, due to the physical configuration of the striker, not be as effective as desired.

The door knocker is affixed adhesively to a door by means of a resilient double stick pad having a thickness substantially equal to the distance between the flat portion and the second portion of the door knocker. With this manner of affixing the knocker to a door or other surface, the second portion is held into contact with the door or other surface, whereby an acoustic coupling is provided between the striking plate and the door.

When formed by the above process, the knocker in accordance with the invention may be highly decorative, and may economically be produced in the small size as would be suitable, for example, for use on the door of a bathroom or bedroom of a home.

In order that the invention will be more clearly understood, it will now be described in greater detail with reference to the accompanying drawings, wherein:

FIG. 6 is a simplified illustration of a process for forming an article in accordance with still a further embodiment of the invention;

FIG. 7 is a top view of an article having relatively slidable parts, which may be fabricated by the processes illustrated in FIGS. 4 and 6;

FIG. 8 is a side view of the article of FIG. 7; and

FIG. 9 is a front view of the article of FIG. 7.

Figure 1:
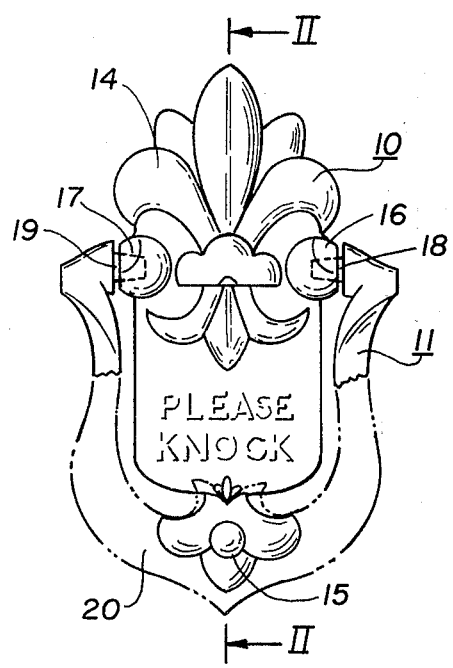
FIG. 1 is a front view of a door knocker in accordance with the invention.

Referring now to the drawings, and more in particular to FIG. 1, therein is illustrated a knocker, such as a door knocker, in accordance with the invention, comprised of a striking plate 10 and a striker 11 pivotally mounted thereto. The striking plate 10 has a rear surface formed of a substantially flat portion 12 in one plane, and a portion 13 lying generally in a plane parallel to the plane of the portion 12, but spaced therefrom in the direction away from the striking nplate 10. The portion 13 may be provided with grooves extending thereacross, as illustrated more clearly in FIG. 3.

The front surface 14 of the striking plate, opposite the rear surface 12, may as indicated in FIG. 1 be provided with any desired ornamentation. An upstanding projection 15 is provided in the surface 14 opposite the rear portion 13. The projection 15, as will be apparent in the following paragraphs, is positioned to be struck by the striker 12 during the manual operation of the knocker. It will be apparent, of course, that suitable configuration of the striker which would enable the striker to engage the portion of the surface 14 opposite the rear portion 13 may obviate the necessity of employing a projection 15.

The striking plate 10 is further provided with opposed aligned bearing means 16 and 17. For example, as illustrated in the Figure, the bearing means 16 and 17 may be in the form of recesses in opposite sides of the striking plate 10.

Figure 2:
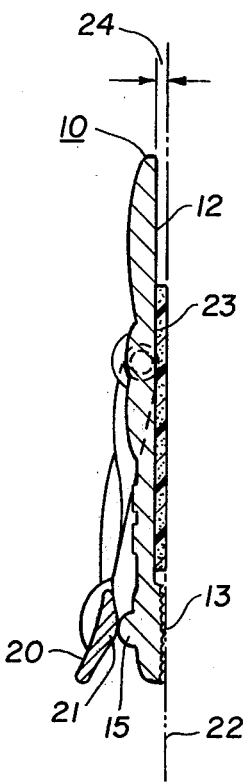
FIG. 2 is a cross sectional view of the door knocker of FIG. 1 taken along the lines II—II.
Figure 3:
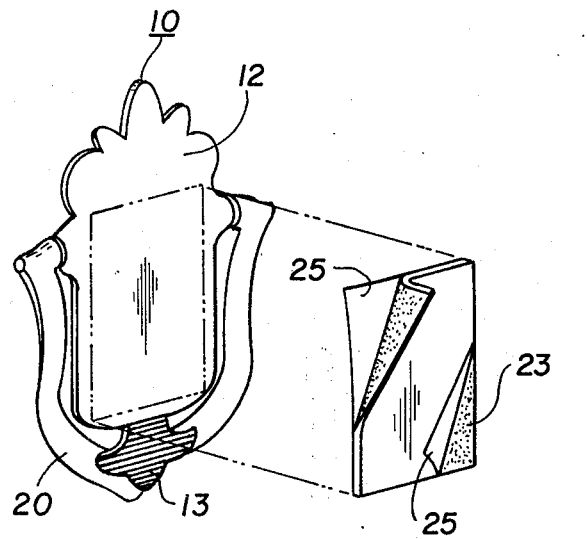
FIG. 3 is a perspective view of the door knocker of FIG. 1, taken from the back side, and illustrating the adhesive layer for mounting the door knocker separated from the door knocker.

The striker 11, in the embodiment of the invention illustrated in FIGS. 1–3, is a generally U-shaped member. The upper ends of the U-shaped member are provided with bearing means 18 and 19, engaging the bearing means 16 and 17 respectively, whereby the U-shaped striker is pivotally mounted to the striking plate. In the illustrated embodiment of the invention, the bearing means 18 and 19 are in the form of projections having circular cross sections, which extend into the recesses which comprises the bearing means 16 and 17.

It will be apparent, of course, that, alternatively to the arrangement illustrated in FIG. 1, the bearing means 16 and 17 may comprise outwardly extending projections, in which case the bearing means 18 and 19 would be formed as recesses for engaging the projections.

The recesses and projections forming the bearing means 16–19 are preferably frusto-conical in shape, since this shape is particularly adaptable to the formation of the knocker in accordance with a process to be described in the following paragraphs. It will be understood, of course, that the structure of the knocker as illustrated in FIGS. 1–3 is not limited to this feature.

The lower portion 20 of the U-shaped striker extends into alignment with the portion 13 of the striking plate, when the striker is in its lowermost position. As discussed above, the striker is adapted to engage the projection 15 of the striking plate, and for this purpose a formed projection 21 may be provided on the rear of the striker to ensure contact between the striker and the striking plate. The projections 15 and 21 serve to hold the bottom of the striker away from a surface on which the knocker is mounted, so that it may be more easily grasped by a user.

In order to mount the knocker in accordance with the invention on a surface, illustrated by the line 22 in FIG. 2, such as a door or wall, a resilient pad 23 is affixed to the flat rear surface 12 of the striking plate. The resilient pad 23 may be adhesively affixed to the surface 12, and may be in the form of a double stick tape, i.e., a tape having an adhesive applied to both sides. Thus, as illustrated in FIG. 3, the pad 23 may initially be provided with an adhesive on both sides, with protective films 25 covering the adhesive layers for removal by a user upon installation of the knocker.

The resilient pad 23 preferably has a thickness substantially equal to the distance 24 between the planes of the rear surfaces 12 and 13.

In order to mount the knocker in accordance with the invention on a door or other surface, the knocker is moved into alignment with the desired mounting position on the door, and is then firmly pressed against the door, whereby the adhesive layer on the back of the resilient pad 23 becomes adhesively bonded to the door. Since the resilient pad has a thickness substantially equal to the distance between the planes of the surface 12 and 13, the knocker is thus held to the door with the surface 13 engaging the door, as illustrated in FIG. 2. As a consequence, an acoustic coupling is provided between the striking plate 10 and the door, by way of the surface 13, so that sound generated by the striking of the striker against the striking plate 10 is transmitted to the door, to enhance the amplitude of sound caused by the operation of the knocker. Any sound insulating effect of the resilient pad 23 is consequently bypassed. The grooves in the surface 13 have been found to ensure a greater acoustic coupling between the striking plate and a door than if the surface 13 were flat.

the knocker illustrated in FIGS. 1–3 may thus be adhesively affixed to a surface which is desirably not marred by other fastening devices such as screws, the knocker being designed so that acoustic coupling is provided between the striking plate and the door in spite of the fact that an adhesive is employed to mount the knocker. If desired, of course, the striking plate may be provided with suitable knock-outs or apertures to enable its mounting by means of screws, for example on an outside door, but such additional holding means have been found not to be necessary either to adequately hold the knocker to a door, or to ensure firm contact between the surface 13 and the door.

The resilient pad may be of any conventional resilient material, such as polypropylene, neoprene or polyethylene. For convenience in distributionn of the knock, the pad 23 may be provided separately, for installation by a user, as illustrated in FIG. 3, whereby the pad may be first affixed to a door, before being affixed to the knocker. In this case, of course, the user peels the films 25 from the pad to expose the adhesive layers just before installation.

The knocker illustrated in FIGS. 1–3 may be formed of any suitable material, such as a metal or a hard plastic. The pivotal interconnection of the striker and the striking plate may be formed by any convenient process, for example, by forming tabs at the back sides of the recesses, which can be bent over pivot pins on the striker to hold the striker pivotally interconnected with the striking plate. In a particularly advantageous method for fabricating the knocker, however, the knocker is formed of a die casting material, such as a zinc die casting alloy, in accordance with the process illustrated in FIG. 4. This process is described generally in U.S. Pat. No. 3,742,555, Karl Hannes, with the exception that in accordance with the present invention the pivotal joints are freed due to the application of stress to one of the members, as will be disclosed in the following paragraphs.

Figure 4:
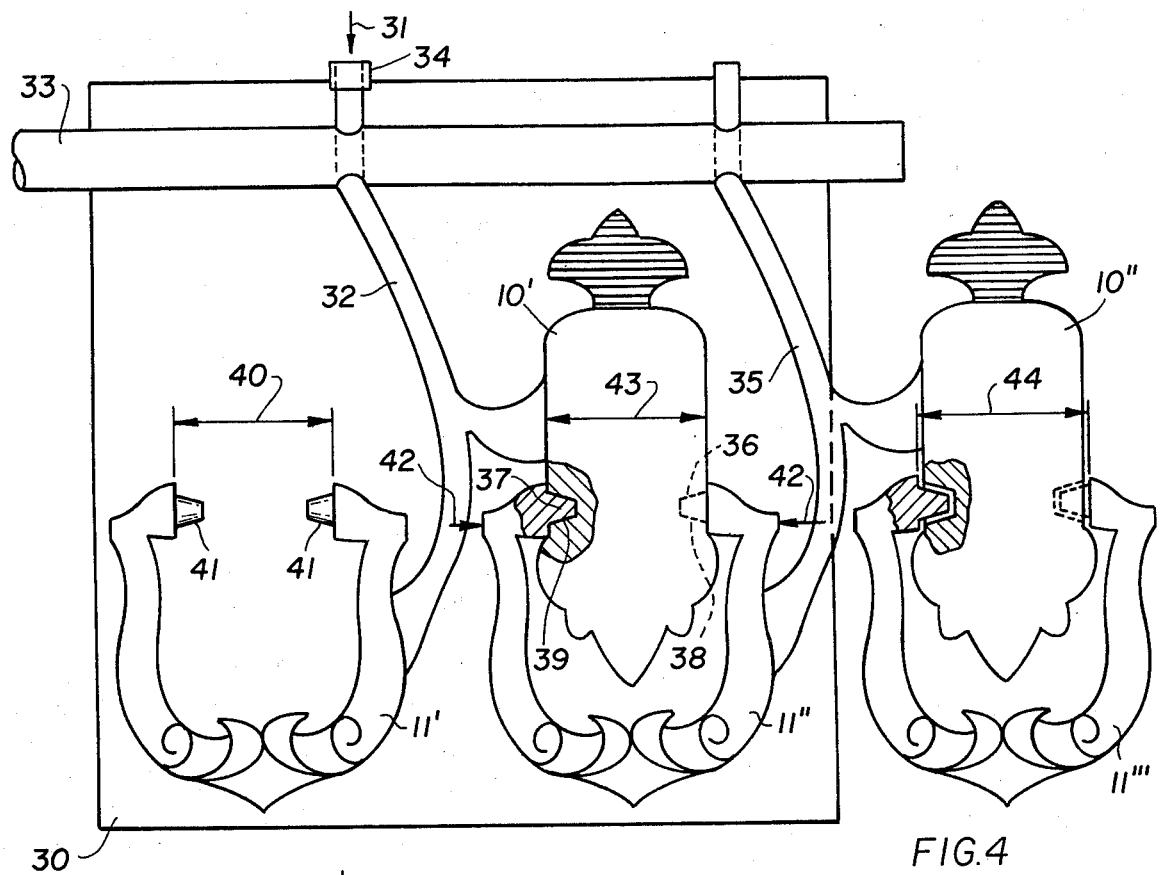
FIG. 4 is a simplified illustration of a process for fabricating an article in accordance with a further embodiment of the invention.

Referring now to FIG. 4, the numeral 30 indicates one die member of a set of movable dies, whereby the dies may be separated to permit the movement of cast elements formed in sequential steps. During the formation of a knocker, or a similar article, in accordance with the invention, heated die casting material is directed into the die members, in the direction indicated by the arrow 31, to form a striker 11' and a striking plate 10' connected to a common gate portion 32, the gate portion 32 extending part way around a transfer core rod 33 to the entrance 34 of the screw.

Prior to the step illustrated in FIG. 4, a striker 11'' and a striking plate 10'', connected to a common gate 35 had been formed in the positions of the die member 30 and its mating die now occupied by the striker 11', striking plate 10' and gate portion 32. Following the casting of the striking plate 10'' and striker 11''', the movable dies had been moved apart, and the transfer core rod 33 moved to the right to transfer these cast elements to their presently indicated positions, the movable dies then being closed to permit the casting of the striking plate 10' and striker 1' as above discussed. It is apparent from FIG. 4, that the striking plate 10' is cast, with the bearing pins 36 and 37 of the striker 11'' forming the mold for the bearing recesses 38 and 39 respectively of the striking plate 10'.

The bearing recesses of the striker 10'' had been similarly previously formed, employing the bearing pins of a still earlier formed striker 11''' as a mold. Following the removal of the striking plate 10'' and its corresponding striker 11''' from the mold members, these cast components are severed from their respective gates by conventional means.

When bearing components are cast by the technique illustrated in FIG. 4, there is a tendency for the pivot joints to be somewhat stiff, due for example to some unevenness in the members at the pivot joint. In the past, instruments formed by this technique have been freed, for loose pivotal movement, by relative reciprocation of the elements. U.S. Pat. No. 3,742,555, discloses an improvement for freeing the pivotal joints, wherein one of the elements is slightly deformed, by a staking operation, to separate the bearings at the joints, frusto-conical shaped bearings being employed so that the staking process is effective in freeing the joint. While the staking process is suitable for some objects, it has been found not to be generally satisfactory either where visible staking marks would be objectionable, or the dimensions of the elements inhibit effective separation of the bearings by this technique.

In accordance with the invention, still referring to FIG. 4, the striker 11' is cast with a given dimension, illustrated by the double ended arrow 40, between the bases of the frusto-conical pivot pins 41. The striker 11'' had previously been formed with the same distance between the bases of its frusto-conical pivot pins 36 and 37. Prior to the casting of the striking plate 10', however, the force indicated by the arrows 42 had been applied to the striker 11'', to force the pins 36 and 37 slightly toward each other, so that the distance between the faces of the pins 36 and 37, as indicated by the double ended arrow 43, is slightly less than the distance indicated by the arrow 40. For example, the difference between these two distances may be approximately 0.01 to 0.02 inches. The stress thus applied to the striker 11'' is below the elastic limit of the material. This stress is held on the striker 11'' during the casting of the corresponding striking plate 10'. For example, the stress may be applied by dimensioning the recess in the die members at the position in which the striker 11'' appears to be slightly smaller than the recess in which the strikers are cast, i.e., the position in which the striker 11' appears.

Following the casting of the striking plate 10', the stress on the corresponding striker 11'' is removed. If the recesses in the die members have been dimensioned as above described, this removal of stress is effected merely by the removal of the cast components from the die members. Due to the removal of the stress, the striker pivots spring back to their original position. Thus, the distance indicated by the double ended arrow 44 between the bases of the frusto-conical pivot pins of the striker 11''' is substantially equal to the distance indicated by the double ended arrow 40. As a result, a slight clearance, shown in exaggerated form between the striking plate 10'' and the striker 11'', is provided between the bearing means of corresponding elements, so that the pivotal joints between the elements are freed.

In the process illustrated in FIG. 4, the bearing means, such as the pivot pins, are directed toward each other, and the bearing means, such as the recesses of the striking plate are directed away from each other, whereby the freeing of the joints may be effected by the relative compression of the striker as above discussed. This process is of course also effective if the bearing recesses are provided on the striker and the pivot pins are provided on the striking plate. In addition, a modification of the process illustrated in FIG. 4 may be employed for freeing the joints of cast articles of the type wherein the first formed member has outwardly directed pivot or recesses and has a re-entrance portion or aperture between the bearing means. Thus, referring to FIG. 5, heated die casting material is directed to the movable die members, only one 50 of which is shown, the casting material being directed as indicated by the arrow 51 to form simultaneously a first U-shaped element 52 and a second element 53 having a common gate 54 extending part way around the transfer core rod 55 to the entrance of the screw 56. The U-shaped member 52 has outwardly extending frusto-conical pivot pins 57, and the element 53 has inwardly directed frusto-conical bearing recesses cast around the frusto-conical outwardly directed bearing pins 59 of a previously cast U-shaped element 52'. The U-shaped element 52' had previously been cast, simultaneously with a further element 53' of the same shape as the element 53, and having a common gate 60. The element 53' had been cast, employing the bearings of a still earlier cast U-shaped member 52'' as a mold.

Figure 5:
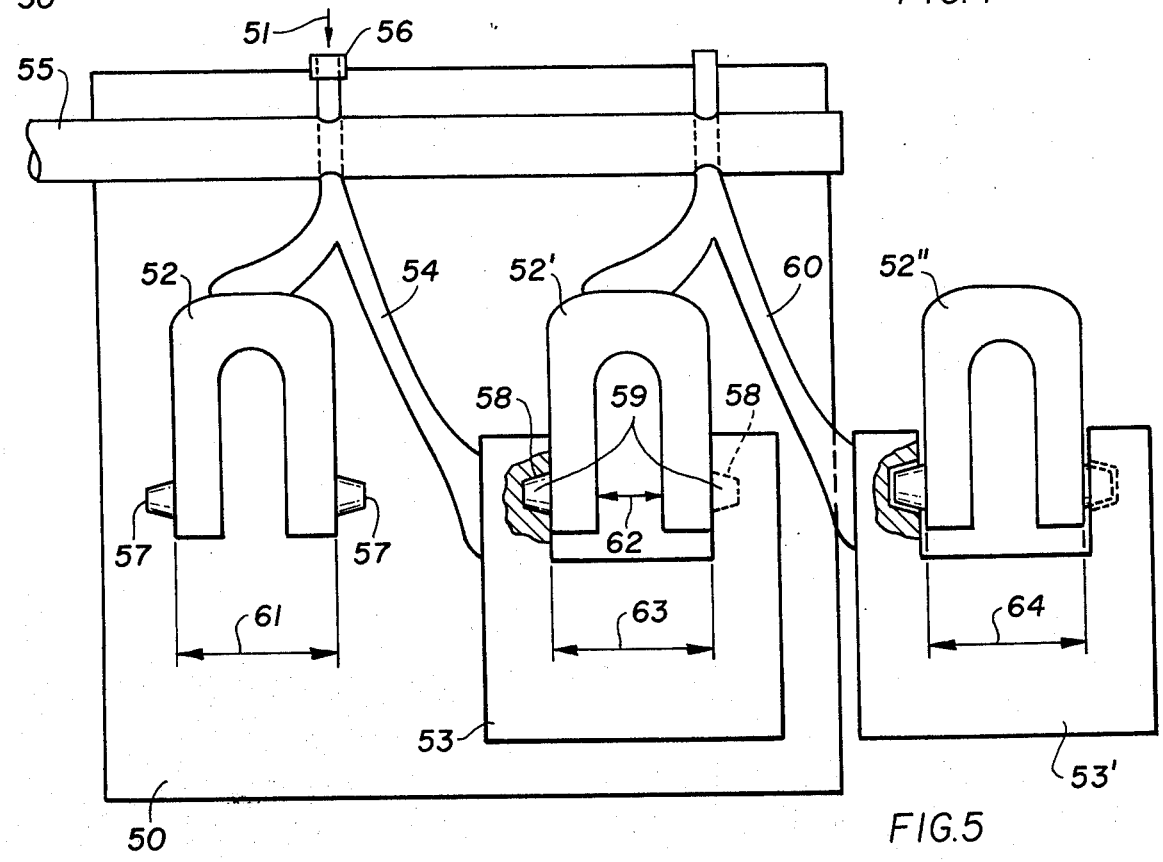
FIG. 5 is a simplified illustration of a process for forming an article in accordance with a further embodiment of the invention.

In the process illustrated in FIG 5, the element 52 is cast with a given dimension, illustrated by the double ended arrow 61 between the bases of the pivot pins 57. The element 52' had been cast earlier with the same dimensions, and prior to the casting of the element 53, the element 52' had been outwardly stressed, as indicated by the double ended arrow 62, so that the dimension between the bases of its pivot pins 59, as indicated by the double ended arrow 63, is slightly greater than the dimension indicated by the double ended arrow 61. As in the process illustrated in FIG. 4, the stress may be held during the casting of the element 53 by suitable dimensioning of the recesses in the movable dies. Following casting of the element 53, the stress is removed from the element 52', whereby the element 52' springs back to its original shape, whereby a free pivotal joint is provided between the elements, as indicated in exaggerated form between the corresponding cast elements 53' and 52'', wherein the dimension between the bases of the pivot pins of the element 52'', shown by the double ended arrow 64, is substantially equal to the dimension indicated by the double arrow 61.

In the process illustrated in FIG. 5, it is apparent that alternatively the pivot pins may be provided on the member 53, and the pivot recesses provided on the member 52'.

Consequently, it is apparent that the process illustrated in FIGS. 4 and 5 is adapted for forming an article of the type having a first member with first and second opposed bearing regions directed in first and second opposite respective directions, the first member having an aperture, such as re-entrant portion, between the opposed bearing regions. Generically, the article cast in accordance with FIGS. 4 and 5 also has a second member with third and fourth opposed bearing regions, the members being joined so that the first and second bearing regions contact the third and fourth bearing regions respectively in such a manner that the members are movable with respect to one another while being restrained at the bearing regions from being separated from one another. In accordance with the invention, the first member is initially formed, either by casting or any other suitable process. Stress is then applied to the first formed member, within the elastic limits thereof, in a direction to relatively displace the first and second bearing regions in first and second opposite directions respectively. While the first member is so stressed, the second member is cast with the first and second bearing regions forming the mold portion for the third and fourth bearing regions. Subsequently, the stress on the first member is released, to permit the first member to return to its original shape, thereby providing free relative movement between the members at the respective bearing regions.

In a modification of the process of FIG. 4, as illustrated in FIG. 6, the movable die member 70, which cooperates with a further (not illustrated) die member, is provided with recesses for the molding of the elements in the same manner as illustrated in FIG. 4. In order to avoid confusion, features of the elements of FIG. 6 which correspond to the features of Fig. are given the same reference numerals. In the arrangement of FIG. 6, however, the transfer core rod 71 is arcuate. Thus, in the arrangement of FIG. 6, the cast elements are transferred by the rotation of the transfer core rod 71 about the pivotal axis of the arc defined by this rod. This technique is useful in some applications in the simplification of the transfer process, and it is also adaptable to the process illustrated in FIG. 5. It is to be further noted that the transfer process illustrated in FIG. 6 may be employed for the formation of other types of die cast components. While in the use of the process illustrated in FIG. 6 for the formation of a knocker of the type illustrated in FIG. 1, it is preferable that the strikers be stressed as described above with reference to FIG. 4, it is apparent that the process illustrated in FIG. 6 may alternatively be employed without such stressing, the process otherwise being the same as that described above with reference to FIG. 4.

It is also apparent that the process in accordance with the invention may be employed for freeing relative movement between elements, wherein the movement is of a sliding type. A device of this type is illustrated in FIGS. 7–9, wherein a slider 80 is provided with parallel straight grooves 81 on opposite sides thereof. The slider 80 is adapted to slide in a member 82 having a U-shaped portion 83 joining a pair of bearing supports 84. The bearing supports 84 provided with projections 85 which engage the groove 81. In the formation of the device of FIGS. 7–9, in accordance with the invention, the member 82 is formed by any conventional means, such as by casting in the technique illustrated in FIGS. 4 and 6. The member 82 is then stressed, as indicated by the arrows 86, to slightly displace the bearing members 84 toward each other, the stress being within the elastic limits of the element 82. The element 80 is then cast, employing the adjoining surfaces of the element 82 as mold portions, in the technique described above with reference to FIG. 4. Subsequently, the stress on the bearing members 84 is relieved, so that these members can spring apart to their original positions. As a result, the member 80 will be freely slidable with respect to the member 82. It is also apparent that, for suitably shaped articles, the process of FIG. 5 may be employed to enable free movement between sliding members.

While the invention has been disclosed and described with reference to a limited number of embodiments, it will be apparent that modifications and variations may be made therein, and it is intended in the following claims to cover each such variation and modification as falls within the true spirit and scope of the invention.

What is claimed is:

1. In a method for forming an article having two relatively movable members, a first of said members having two bearing portions and an apertured portion between said bearing portions, the bearing portions being aligned and oppositely directed, and the second of said members having two aligned bearing structures positioned to cooperate with said bearing portions, the method including forming said first member, inserting said bearing portions of said first member in a mold cavity, casting material in said mold cavity to thereby form said second member, and removing said first and second members together from said mold cavity; the improvement comprising applying mechanical stress to said first member within its elastic limit in directions toward the portions of said mold cavity within which said bearing structures are cast, then casting said material in said mold cavity to form said second member, and then releasing said mechanical stress after said material has set to thereby provide clearance between said first and second members.

2. The method of claim 1 wherein said step of forming said first member comprises casting said first member.

3. The method of claim 1 for forming an article wherein said bearing portions means comprise frusto-conical surfaces directed toward each other on said first member, wherein said step of stressing comprises stressing said first member in a direction to move said frusto-conical surfaces toward each other.

4. The method of claim 1 for forming an article wherein said bearing portions are directed away from each other, wherein said step of stressing comprises stressing said first member to displace said frusto-conical away from each other.

5. The method of claim 1 wherein said step of forming comprises forming a first member with bearing portions in the form of sliding surfaces.

6. The method of claim 1 in which said step of forming comprises casting said first member in a first position, and said step of casting said second member comprises casting said second member in a second position, further comprising moving said first member in a linear direction between said first position and said second position following the forming of said first member in the casting of said second member.

7. The method of claim 1 wherein said step of forming comprises casting said first member at a first position, and said step of casting said second member at a second position, and further comprising moving said first member in an arcuate path between said steps of forming said first member and said casting of said second member.

* * * * *

UNITED STATES PATENT OFFICE
CERTIFICATE OF CORRECTION

Patent No. 3,978,189      Dated August 31, 1976

Inventor(s) Ruediger Einhorn

It is certified that error appears in the above-identified patent and that said Letters Patent are hereby corrected as shown below:

Column 2, line 68, "as" should read -- at --.

Column 4, line 20, change "nplate" to -- plate --.

Column 5, line 42, "the" should read -- The --.

line 57, "distributionn" should read -- distribution --.

Column 6, line 34, "1'" should read -- 11' --.

Signed and Sealed this

First Day of February 1977

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,978,189    Dated August 31, 1976

Inventor(s) Ruediger Einhorn

It is certified that error appears in the above-identified patent and that said Letters Patent are hereby corrected as shown below:

Column 1, lines 26 and 28, "screw", each occurrence, should be -- sprue --; line 64, after "elements" add -- of articles such as, but not limited to, door knockers, pull knobs, etc. --.
Column 4, before line 12, insert -- Figs. 10-12 are cross sectional views of modifications of a portion of the article of Figs. 7-9; and Fig. 13 is a perspective view of a pull knob that may also be fabricated in accordance with the invention --.
Column 6, line 23, "screw" should read -- sprue --.
Column 7, line 54, "screw" should read -- sprue --.
Column 8, line 58, before "are" insert -- 4 --.

Signed and Sealed this

Twenty-eighth Day of June 1977

[SEAL]

Attest:

RUTH C. MASON
*Attesting Officer*

C. MARSHALL DANN
*Commissioner of Patents and Trademarks*